United States Patent
Wang et al.

(10) Patent No.: US 11,945,650 B2
(45) Date of Patent: Apr. 2, 2024

(54) MOVABLE BOX AND METHOD FOR CONTROLLING THE SAME, PACKAGE STORAGE DEVICE AND COMPUTER READABLE STORAGE MEDIUM

(71) Applicant: BOE Technology Group Co., Ltd., Beijing (CN)

(72) Inventors: Shu Wang, Beijing (CN); Hui Rao, Beijing (CN); Zhiguo Zhang, Beijing (CN); Xin Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 899 days.

(21) Appl. No.: 16/970,423

(22) PCT Filed: Feb. 18, 2020

(86) PCT No.: PCT/CN2020/075683
§ 371 (c)(1),
(2) Date: Aug. 17, 2020

(87) PCT Pub. No.: WO2020/169020
PCT Pub. Date: Aug. 27, 2020

(65) Prior Publication Data
US 2021/0229913 A1 Jul. 29, 2021

(30) Foreign Application Priority Data
Feb. 22, 2019 (CN) .......................... 201910133089.1

(51) Int. Cl.
*B65G 1/04* (2006.01)
*G05D 1/00* (2006.01)
(Continued)

(52) U.S. Cl.
CPC .......... *B65G 1/0492* (2013.01); *G05D 1/0022* (2013.01); *G06Q 10/08* (2013.01); *G07C 9/00571* (2013.01); *G07F 17/12* (2013.01)

(58) Field of Classification Search
CPC .... B65G 1/0492; G05D 1/0022; G06Q 50/28; G06Q 10/08; G07C 9/00571; G07F 17/12
See application file for complete search history.

(56) References Cited

U.S. PATENT DOCUMENTS 3,974,898 A * 8/1976 Tullis .................... A45C 7/0045
                                                              312/111
7,815,112 B2 * 10/2010 Volpe ....................... G07F 17/13
                                                              340/568.1
(Continued)

FOREIGN PATENT DOCUMENTS

CN        205302477 U      6/2016
CN        106108428 A      11/2016
(Continued)

OTHER PUBLICATIONS

Office Action dated Jun. 28, 2020, issued in counterpart CN Application No. 201910133089.1, with English Translation. (33 pages).

*Primary Examiner* — Michael Collins
(74) *Attorney, Agent, or Firm* — WHDA, LLP

(57) ABSTRACT

The present disclosure discloses a movable box and a method for controlling the same, and a package storage device. The movable box includes a box body, a box door, a security lock and a verification component. The security lock is connected between the box body and the box door, the verification component is disposed on a surface of the box door and is connected to the security lock, and the verification component is configured to acquire verification information, and control the security lock to be unlocked in response to the verification information being preset infor- (Continued)

mation, and a first locking member is further disposed in the box body at a bottom thereof, and the first locking member protrudes downward from the bottom of the box body.

18 Claims, 6 Drawing Sheets

(51) Int. Cl.
  *G06Q 10/08* (2023.01)
  *G07C 9/00* (2020.01)
  *G07F 17/12* (2006.01)

(56) References Cited

U.S. PATENT DOCUMENTS

| | | | | |
|---|---|---|---|---|
| 8,358,199 | B2* | 1/2013 | Nesling | G07C 9/00912 340/568.1 |
| 9,980,020 | B1* | 5/2018 | Sharp | G07C 9/00174 |
| 10,424,143 | B2* | 9/2019 | Miller | G07C 9/00912 |
| 11,069,169 | B2* | 7/2021 | Huang | G06F 16/2379 |
| 2005/0104730 | A1* | 5/2005 | Yang | A47G 29/141 340/569 |
| 2013/0081434 | A1* | 4/2013 | Grant | E05B 47/026 70/1.5 |
| 2016/0050191 | A1* | 2/2016 | Alt | H04L 63/108 726/4 |
| 2017/0096300 | A1 | 4/2017 | De Roquette Buisson et al. | |
| 2018/0060800 | A1* | 3/2018 | Robinson | G07C 9/00182 |
| 2018/0075681 | A1* | 3/2018 | Scalisi | G06K 7/10366 |
| 2018/0357843 | A1* | 12/2018 | Zurkuhlen | G07F 17/12 |
| 2020/0193373 | A1* | 6/2020 | Varman | A47G 29/1218 |

FOREIGN PATENT DOCUMENTS

| | | |
|---|---|---|
| CN | 107393200 A | 11/2017 |
| CN | 107424342 A | 12/2017 |
| CN | 107742374 A | 2/2018 |
| CN | 108091070 A | 5/2018 |
| CN | 109150509 A | 1/2019 |
| CN | 109872465 A | 6/2019 |

* cited by examiner

MOVABLE BOX AND METHOD FOR CONTROLLING THE SAME, PACKAGE STORAGE DEVICE AND COMPUTER READABLE STORAGE MEDIUM

CROSS-REFERENCE TO RELATED APPLICATIONS

This application is a Section 371 National Stage Application of International Application No. PCT/CN2020/075683, filed on Feb. 18, 2020 and claims priority to Chinese Application No. 201910133089.1, filed on Feb. 22, 2019, the contents of which are incorporated herein by reference in their entirety.

TECHNICAL FIELD

The present disclosure relates to the technical field of package storage, and more particularly, to a movable box and a method for controlling the same, a package storage device and a computer readable storage medium.

BACKGROUND

With the rapid development of e-commerce, people have gradually begun to purchase goods through online shopping, and products which are purchased through online shopping are generally delivered to people through express companies, or packages are stored in lockers, so that people may collect their packages from the lockers after they go home.

In the related technologies, each community may have one or more lockers disposed therein, but there are different use conditions of lockers in different communities or at different times. Some communities may have insufficient lockers, and some communities may have many vacant lockers, which makes it difficult to match the lockers with a volume of package delivery, thereby resulting in a problem of a low utilization rate of the lockers.

SUMMARY

According to a first aspect of the embodiments of the present disclosure, there is provided a movable box comprising a box body, a box door, a security lock and a verification component, wherein the security lock is connected between the box body and the box door, the verification component is disposed on a surface of the box door and is connected to the security lock, and the verification component is configured to acquire verification information, and control the security lock to be unlocked in response to the verification information being preset information, and a first locking member is further disposed in the box body at a bottom thereof, and the first locking member protrudes downward from the bottom of the box body.

In an embodiment, the verification component comprises a password input device and a first processor, wherein the password input device is connected to the first processor, the first processor is connected to the security lock, the password input device is configured to input password verification information, and the first processor is configured to control the security lock to be unlocked when the password verification information is unlocking information.

In an embodiment, the movable box further comprises:

a first connector connected to the first processor, and configured to be in signal connection to a preset terminal device, wherein the first processor is configured to transmit the unlocking information to the preset terminal device through the first connector in response to the first processor being in signal connection to the preset terminal device.

In an embodiment, the movable box further comprises:

a sensing element connected to the first processor, and configured to detect an open/closed state of the box door, and transmit information of the open/closed state to the first processor, wherein the first processor randomly generates the unlocking information when the box door is in a closed state.

In an embodiment, the movable box further comprises:

a display device connected to the first processor, wherein the preset terminal device is configured to transmit logistics information to the display device through the first connector and the first processor when the first processor is connected to the preset terminal device, so that the display device displays the logistics information.

In an embodiment, the display device is an electronic ink screen.

In an embodiment, the verification component comprises a second connector and a second processor, the second connector is connected to the second processor, the second processor is connected to the security lock, the second connector is configured to be wirelessly connected to a client terminal device to acquire identity verification information transmitted by the client terminal device, and the second processor controls the security lock to be unlocked when the identity verification information is unlocking information.

According to a second aspect of the embodiments of the present disclosure, there is provided a package storage device, comprising:

a fixing mechanism having a plurality of stoppers disposed thereon; and the movable box described above, wherein the movable box is detachably connected to at least one of the plurality of stoppers of the fixing mechanism.

In an embodiment, the at least one stopper comprises a corresponding second locking member which is mutually locked with the first locking member of the movable box, and the second locking member or the first locking member is further connected to an unlocking member which is configured to unlock the second locking member from the first locking member.

In an embodiment, the second locking member comprises a lock hole, the first locking member comprises a lock pillar which is configured to be inserted into the lock hole, so that the second locking member is mutually locked with the first locking member.

In an embodiment, the unlocking member comprises a lock body and a transmission member, the lock body is connected to the second locking member or the first locking member through the transmission member, the lock body has a key hole disposed thereon, and the key hole is configured to cause the lock body to move, s that the second locking member is unlocked from the t locking member.

According to a third aspect of the embodiments of the present disclosure, there is provided a method for controlling a movable box, which is applied to the movable box described above, the method comprising:

inputting verification information into the movable box; and determining whether the verification information matches an unlocking instruction of the preset information, and if so, controlling the security lock to be unlocked.

In an embodiment, the preset information is generated in advance by a first processor and is stored in an information memory of the movable box.

In an embodiment, the method further comprises:

acquiring, by a preset terminal device, the preset information in the information memory, and transmitting the preset information to a system database, wherein the first processor is in a sleep state.

In an embodiment, the method further comprises:

waking up the first processor in a sleep state, inputting, by the preset terminal device, logistics information into the first processor, and displaying the logistics information on a display device.

In an embodiment, the method further comprises:

after displaying the logistics information on the display device, acquiring, by the preset terminal device, serial number information in the information memory, and transmitting the serial number information to the system database, wherein the first processor is in a sleep state.

In an embodiment, inputting verification information into the movable box comprises:

acquiring the unlocking instruction in the preset information from the system database, and inputting the unlocking instruction into the movable box, as the verification information.

In an embodiment, the preset information comprises a plurality of random passwords arranged in order, and determining whether the verification information matches the unlocking instruction of the preset information, and if so, controlling the security lock to be unlocked further comprises:

waking up, by the preset terminal device, the first processor, causing the first processor and the database system to perform timing at the same time, and replacing, by the first processor and the database system, a current random password with a succeeding random password at the same time every preset time as the unlocking instruction of the preset information.

In an embodiment, the method further comprises:

after determining whether the verification information matches the unlocking instruction of the preset information, and if so, controlling the security lock to be unlocked, controlling, by the first processor, the display device to display package removal information.

In an embodiment, the method further comprises:

after the first processor controls the display device to display the package removal information, acquiring, by the preset terminal device, the serial number information in the information memory, and changing a package state corresponding to the serial number information in the system database according to the serial number information.

According to a fourth aspect of the embodiments of the present disclosure, there is provided a computer readable storage medium, having stored therein computer instructions, which cause the computer to implement the method for controlling a movable box described above.

BRIEF DESCRIPTION OF THE ACCOMPANYING DRAWINGS

DETAILED DESCRIPTION

In order to further explain the technical solutions which are used in the present disclosure to achieve the predetermined purposes of the present disclosure as well as their effects, specific implementations, structures, features and effects of a movable box and a package storage device according to the present disclosure will be described in detail later in conjunction with accompanying drawings and preferred embodiments.

The embodiments of the present disclosure provide a movable box and a package storage device, which are used to reduce a vacancy rate of the package storage device. In the related technologies, there are different use conditions of lockers in different communities or at different times. Some communities may have insufficient lockers, and some communities may have, many vacant lockers, which makes it difficult to match the lockers with a volume of package delivery, thereby resulting in a problem of a low utilization rate of the lockers. Compared with the related technologies, the package storage device according to the present embodiment comprises a fixing mechanism and movable boxes. Here, the fixing mechanism has a plurality of stoppers disposed thereon, and each of the movable boxes is detachably connected to at least one of the plurality of stoppers of the fixing mechanism. In a practical application process, a delivery man may detach a movable box from the fixing mechanism and bring it to a package station, and when there is a package to be delivered, the delivery man may place the package in the movable box, deliver the movable box to a fixing mechanism of a community, dispose the movable box at at least one stopper of the fixing mechanism, and bring the movable box back to the package station after a user collects the package from the movable box. In this way, all the movable boxes on the fixing mechanism have packaged items, which improves the utilization rate of the movable boxes and reduces the high vacancy rate of the movable boxes.

Figure 1:
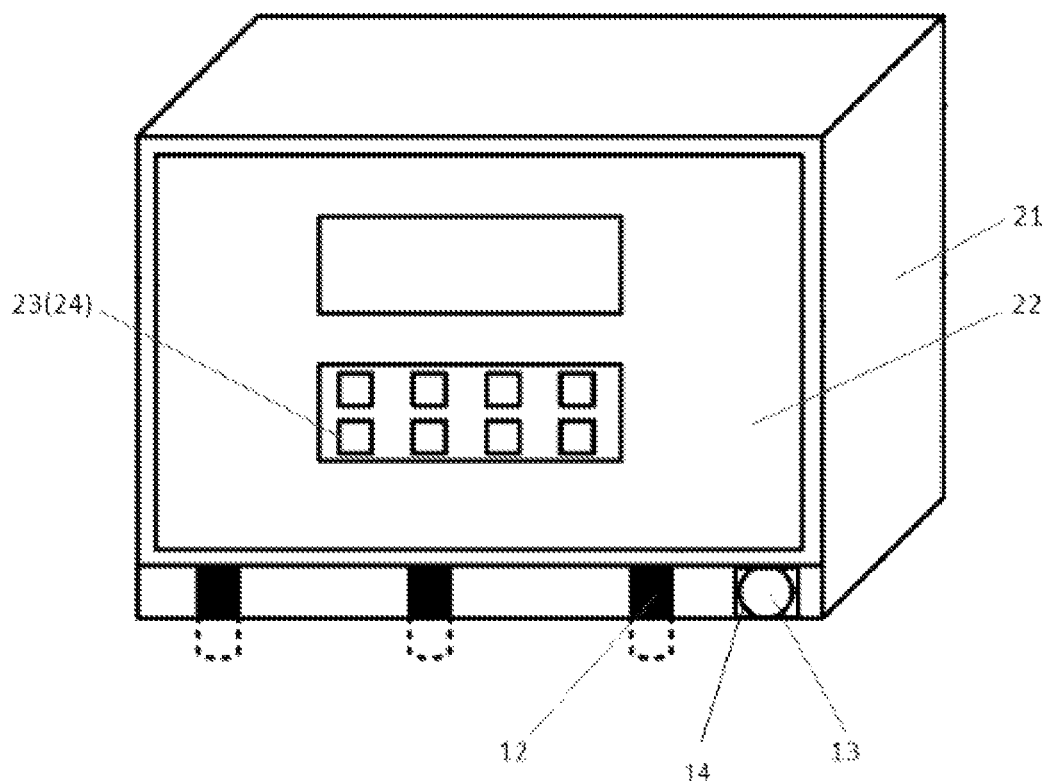
FIG. 1 is a schematic structural diagram of a movable box according to an embodiment of the present disclosure.
Figure 2:
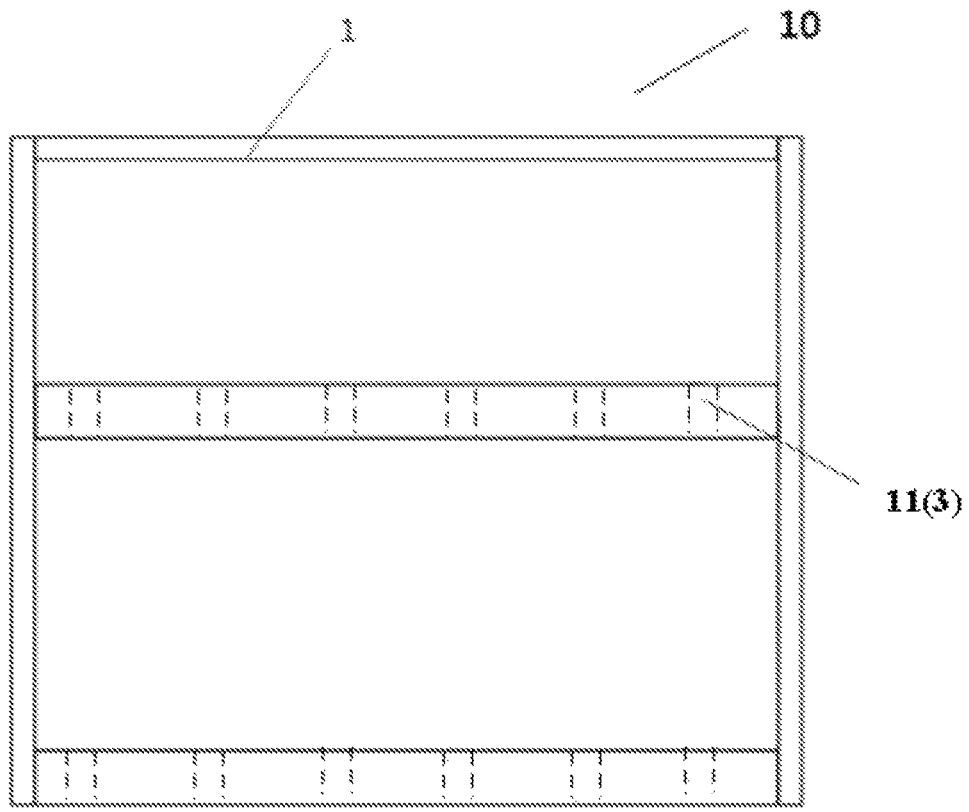
FIG. 2 is a schematic structural diagram of a fixing mechanism of a package storage device according to an embodiment of the present disclosure.

FIG. 1 is a schematic structural diagram of a movable box 2 according to an embodiment of the present disclosure, and FIG. 2 is a schematic structural diagram of a fixing mechanism 1 of a package storage device 10 according to an embodiment of the present disclosure.

The movable box 2 is detachably connected to at least one of a plurality of stoppers 3 disposed on the fixing mechanism 1 of the package storage device 10 (according to a perspective of FIG. 2 in this embodiment, dotted lines indicate that the stoppers 3 are located within the fixing mechanism 1), and the movable box 2 comprises a box body 21, a box door 22, a security lock and a verification component 23. The security lock is disposed to be connected between the box body 21 and the box door 22, the verification component 23 is connected to the security lock, and the verification component 23 is used to acquire verification information, and control the security lock to be unlocked when the verification information is preset information. The package storage device is mainly used to store packages. Specifically, when a user may not collect a package in time, a delivery man may store the packaged items in the package storage device, and, then the user may collect his/her own packages from the package storage device. The package storage device is mainly disposed in a public service area of a community to facilitate users and delivery men collecting and placing packages, which increases the delivery speed of packages.

Here, the fixing mechanism 1 is mainly used to be disposed in the public service area of the commodity, and the fixing mechanism 1 is mainly used to fix the movable box 2 to prevent the movable box 2 from being moved or lost. In an application process, the fixing mechanism 1 is always in a fixed state. Specifically, the fixing mechanism 1 may be fixed on the ground through bolts. The fixing mechanism 1 may have a frame-like structure, which may reduce a weight of the fixing mechanism 1 and reduce a cost of the package storage device. Further, the fixing mechanism 1 may be configured to have a multi-layer structure, so that more movable boxes 2 may be placed therein.

Here, the fixing mechanism 1 has a plurality of stoppers 3 disposed thereon, and the above movable box 2 may be fixed through the stoppers 3. The stoppers may have various structures, which will be explained in detail below, and will not be repeated here. The stoppers may be arranged in sequence on the fixing mechanism 1, at least one of the stoppers may have one movable box 2 disposed thereon, and the movable box 2 may be detachably connected to the stopper. A specific use process is as follows.

Firstly, the movable box 2 may be disposed at a package station. When a delivery man receives a package, the delivery man may place the package in the movable box 2, then deliver the movable box 2 to a fixing mechanism 1 of a community, and fix the movable box 2 on at least one stopper of the fixing mechanism 1.

Then, a user may arrive at the fixing mechanism 1, open the corresponding movable box 2, and then collect packages in the movable box 2.

Finally, when the delivery man comes to the fixing mechanism 1 again, the delivery man may take back the movable box 2 without the packages, and bring the movable box 2 back to the package station to load other packages therein.

Here, the movable box 2 is mainly used to store packages. In order to prevent the packages in the movable box 2 from being collected by others, the movable box 2 further has a security lock and a verification component 23 disposed thereon, wherein the security lock is connected between the box body 21 and the box door 22, and when the security lock is locked, the box door 22 may not be opened with respect to the box body 21. When the security lock is unlocked, the box door 22 may be opened with respect to the box body 21. The verification component 23 is connected to the security lock, and the verification component 23 is used to acquire verification information. There may be a variety of verification information, for example, password input information, identity verification information, face recognition information, etc. The verification component 23 is used to verify the above verification information. When the verification information is preset information, that is, when the verification information is correct, the verification component 23 may input a control signal to the security lock to control the security lock to be unlocked, so that a user may collect the packages in the movable box 2. In this embodiment, the verification component 23 may be disposed, so that identity verification information of a consignee may be verified. If the verification information is correct, the packages may be collected; and if the verification information is incorrect, the packages may not be collected, thereby ensuring the safety of the packages.

The embodiments of the present disclosure provide a movable box and a package storage device, which are used to reduce a vacancy rate of the package storage device. In the related technologies, there are, different use conditions of lockers in different communities or at different times. Some communities may have insufficient lockers, and some communities may have many vacant lockers, which makes it difficult to match the lockers with a volume of package delivery, thereby resulting in a problem of a low utilization rate of the lockers. Compared with the related technologies, the package storage device according to the present embodiment comprises a fixing mechanism and movable boxes. Here, the fixing mechanism has a plurality of stoppers disposed thereon, and each of the movable boxes is detachably connected to at least one of the plurality of stoppers of the fixing mechanism. In a practical application process, a delivery man may detach a movable box from the fixing mechanism and bring it to a package station, and when there is a package to be delivered, the delivery man may place the package in the movable box, deliver the movable box to a fixing mechanism of a community, dispose the movable box at at least one stopper of the fixing mechanism, and bring the movable box back to the package station after a user collects the package from the movable box. In this way, all the movable boxes on the fixing mechanism have packages, which improves the utilization rate of the movable boxes and reduces the high vacancy rate of the movable boxes.

In an implementation of the present disclosure, a first locking member 12 is disposed in the box body 21 at a bottom thereof. The at least one stopper 3 comprises a corresponding second locking member 11. In an embodiment, the first locking member 12 may protrude downward from the bottom of the box body to be mutually locked with the second locking member 11. The second locking member 11 or the first locking member 12 is further connected to an unlocking member 14, which is used to unlock the second locking member 11 from the first locking member 12. Here, the second locking member 11 and the first locking member 12 are used to be locked with each other or be unlocked from each other. When the second locking member 11 is mutually locked with the first locking member 12, the movable box 2 may be fixed to the fixing mechanism 1, which makes it impossible for others to take the movable box 2 away from the fixing mechanism 1, thereby ensuring the safety of the movable box 2. When the second locking member 11 is unlocked from the first locking member 12, that is, the second locking member 11 is disconnected from the first locking member 12, the first locking member 12 may be retracted back into the box body 21 at the bottom surface thereof. At this time, the delivery man may take the movable box 2 away from the fixing mechanism 1 to load other packages therein. The unlocking member 14 is connected to the second locking member 11 or the first locking member 12, so that the second locking member 11 is unlocked from the first locking member 12, and an unlocking device for the unlocking member 14 may generally be hold by the delivery man with hands, so that the delivery man may take away the movable box 2 to load other packages therein. The unlocking member may have a variety of structures, which will be described in detail below and will not be repeated here.

Further, the second locking member 11 comprises a lock hole, and the first locking member 12 comprises a lock pillar, which is used to be inserted into the lock hole to lock the second locking member 11 and the first locking member 12 with each other. In this embodiment, an opening of the lock hole may be disposed upward, and the lock pillar on the movable box 2 may be disposed downward, so that the lock pillar may be easily inserted into the lock hole. When the lock pillar is inserted into the lock hole, the lock pillar may be fixed to the lock hole, so that the fixing mechanism 1 may not be separated from the movable box 2. Specifically, the lock pillar has a retractable clamping joint on sidewalls thereof, and the lock hole may have a clamping groove on inner walls thereof. When the lock pillar is inserted into the lock hole, the clamping joint may be clamped in the clamping groove, so that the lock pillar may not be pulled out from the lock hole. When unlocking is required, the unlocking member may cause the clamping joint to be retracted, so that the clamping joint is detached from the clamping groove, and then the lock pillar may be pulled out from the lock hole. Similarly, in another embodiment, the lock pillar may have a clamping groove on the sidewalls thereof, and the lock hole, may have, a retractable clamping joint disposed on the inner walls thereof. A working principle is the same as the above, and will not be specifically limited here. In this embodiment, the lock hole and the lock pillar are disposed, so that the movable box 2 is more easily fixed to the fixing mechanism 1. In addition, the fixing mechanism 1 may have a number of lock holes, so that the movable box 2 is connected to different lock holes, which makes it more flexible to dispose the movable box 2 on the fixing mechanism 1, thereby improving the practicability of the package storage device.

The second locking member 11 and the first locking member 12 described above may also adopt other structures, in addition to the lock hole and the lock pillar. Specifically, the second locking member 11 comprises a first connecting ring, the first locking member 12 comprises a second connecting ring, the first connecting ring and the second connecting ring correspond to each other, and the first connecting ring is connected to the second connecting ring through a locking tool. In this embodiment, the second locking member 11 and the first locking member 12 have simple structures, which may reduce a manufacturing cost of the package storage device.

In an implementation of the present disclosure, the unlocking member 14 comprises a lock body and a transmission member. The lock body is connected to the second locking member 11 or the first locking member 12 through the transmission member. The lock body has a key hole 13 disposed thereon, and the key hole 13 is used to cause the lock body to move, so that the second locking member 11 is unlocked from the first locking member 12. In this embodiment, the unlocking member may cause the second locking member 11 to be unlocked from the first locking member 12 through a key. Specifically, a delivery man may insert the key into the key hole 13 and turn the key hole 13. When the key hole 13 rotates, the lock body may unlock the second locking member 11 from the first locking member 12 through the transmission member, so that the movable box 2 may be taken away from the fixing mechanism 1. In this embodiment, the key hole 13 is disposed to ensure that the delivery man may conveniently take the movable box 2 away from the fixing mechanism 1, which on one hand, ensures the safety of the movable box 2, and on the other hand, may improve the convenience of the unlocking. In addition, the lock body having the key hole 13 has a low manufacturing cost, thereby reducing an overall cost of the package storage device.

The unlocking member may also adopt other manners, in addition to the mechanical unlocking manner. In an embodiment, the unlocking element may comprise a driving element and a Near Field Communication (NFC) sensing element which is connected to the driving element, and the driving element is connected to the second locking element 11 or the first locking element 12. An NFC card may be wirelessly connected to the NFC sensing element by the delivery man, and transfer identity information of the delivery man to the NFC sensing element. After the identity information is verified, the driving element causes the second locking member 11 or the first locking member 12 to move, so that the second locking member 11 is unlocked from the first locking member 12.

Figure 3:
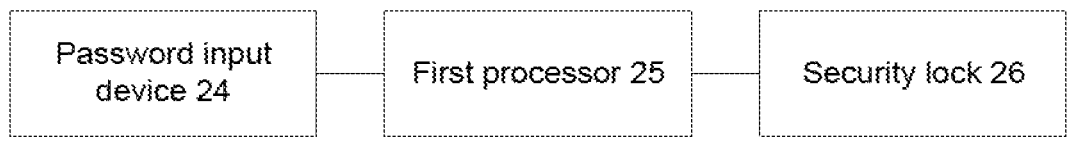
FIG. 3 is a schematic structural diagram of a movable box according to an embodiment of the present disclosure.

In an implementation of the present disclosure, as shown in FIG. 3, the verification component 23 comprises a password input device 24 and a first processor 25. The password input device 24 is connected to the first processor 25, the first processor 25 is connected to the security lock 26, the password input device 24 is used to input password verification information, and when the password verification information is unlocking information, the first processor 25 is used to control the security lock 26 to be unlocked. In this embodiment, the password input device 24 may be a password input keyboard or a touch screen for password input. The password input device 24 may be disposed on the box door 22 of the movable box 2, so that a user may input password verification information. The password input device 24 is used to transmit the input password verification information to the first processor 25, and the first processor 25 is used to determine whether the password input information is the unlocking information, if so, the first processor 25 may control the security lock 26 to be unlocked to enable the box door 22 to be opened, and if not, the security lock 26 is not unlocked so as to ensure the safety of the packages in the movable box 2.

Further, the above movable box further comprises a first connector 27 and the first processor 25. The first connector 27 is connected to the first processor 25, and the first connector 27 is used to be in wireless communication with a preset terminal device 3. When the first processor 25 is connected to the preset terminal device 3, the first processor 25 is used to transmit the unlocking information to the preset terminal device 3 through the first connector 27. In this embodiment, the first processor 25 may be connected to the preset terminal device 3 which is hold by the delivery man with the hands through the first connector 27, so that the first processor 25 may exchange data with the preset terminal device 3. Further, the preset terminal device 3 may be connected to a network server, so that the first processor 25 may transmit the unlocking information to the network server through the preset terminal device 3, and a client may acquire the unlocking information after the client passes identity verification in the network server, so as to unlock the security lock 26 of the movable box 2. In addition to transmitting the unlocking information to the preset terminal device 3, the above first processor 25 may also transmit a tag Identity (ID) of the movable box 2 to the network server through the preset terminal device 3, so that the client may acquire the tag ID while acquiring the unlocking information, and thereby the client may easily find the movable box 2. In a practical application process, after the delivery man place a package into the movable box 2, the first processor 25 may transmit the unlocking information and the tag ID to the network server, and the delivery man does not know the unlocking information and may not open the movable box 2, which further ensures the safety of the package. After the movable box 2 is delivered to the designated fixing mechanism 1, a client may acquire the unlocking information and the tag ID through the web server, find the corresponding movable box 2 through the tag ID, and then unlock the movable box 2 using the unlocking information to collect packages from the movable box 2.

Further, the above first connector 27 may be a radio frequency identification module, an infrared module, a Bluetooth module, etc.

Figure 4:
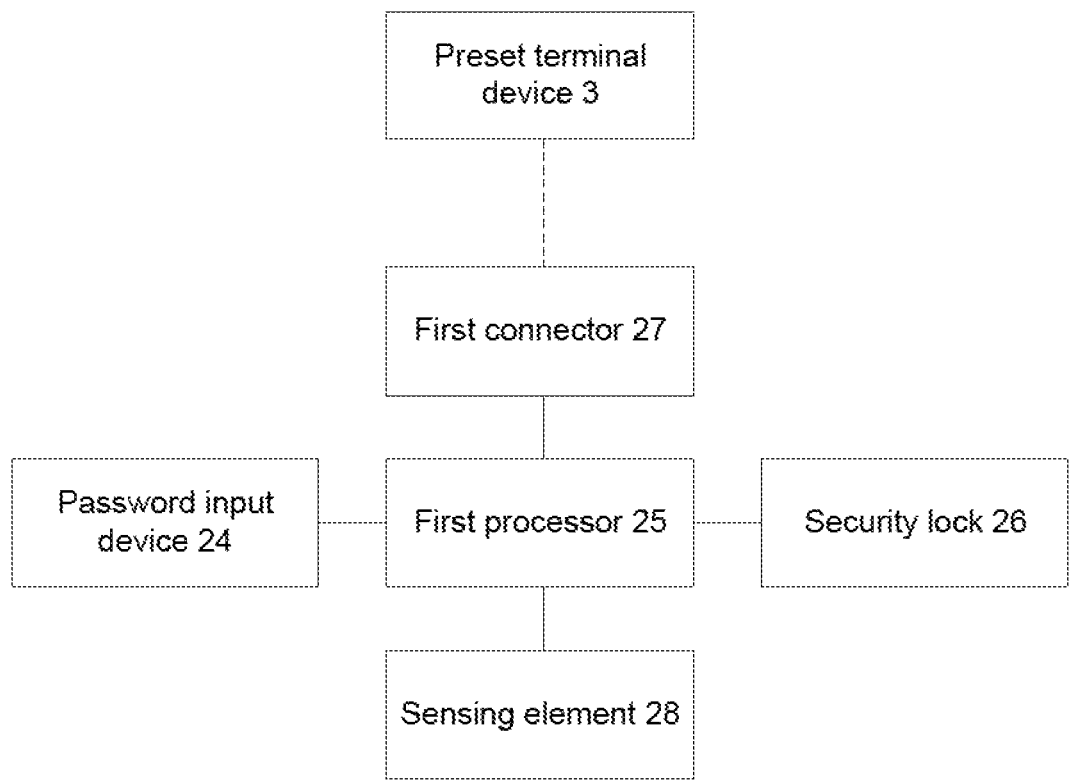
FIG. 4 is a schematic structural diagram of a movable box according to another embodiment of the present disclosure.

Further, as shown in FIG. 4, the above movable box further comprises a sensing element 28 which is connected to the first processor 25. The sensing element 28 is used to detect an open/closed state of the box door 22 and transmit information of the open/closed state to the first processor 25. When the box door 22 is in a closed state, the first processor 25 is used to randomly generate the unlocking information. In this embodiment, the above sensing element 28 may be a variety of sensors, for example, an infrared sensor, a pressure sensor, etc., which will not be specifically limited herein. In a practical application process, after the delivery man places the package into the movable box 2 and closes the box door 22, the box door 22 is locked with the box body 21 by the security lock 26. When the sensing element 28 detects that the box door 22 is in the closed state, the first processor 25 may randomly generate the unlocking information, which may be a group of unlocking passwords, and a client may open the movable box 2 through the unlocking passwords. In order to further improve the security, the unlocking information may also be multiple groups of passwords, wherein a first group of passwords among the multiple groups of passwords is used as a password for opening the movable box 2 on a first day, a second group of passwords among the multiple groups of passwords is used as a password for opening the movable box on a second day, and so on. There are different passwords for opening the movable box every day, which may improve the security.

Figure 5:
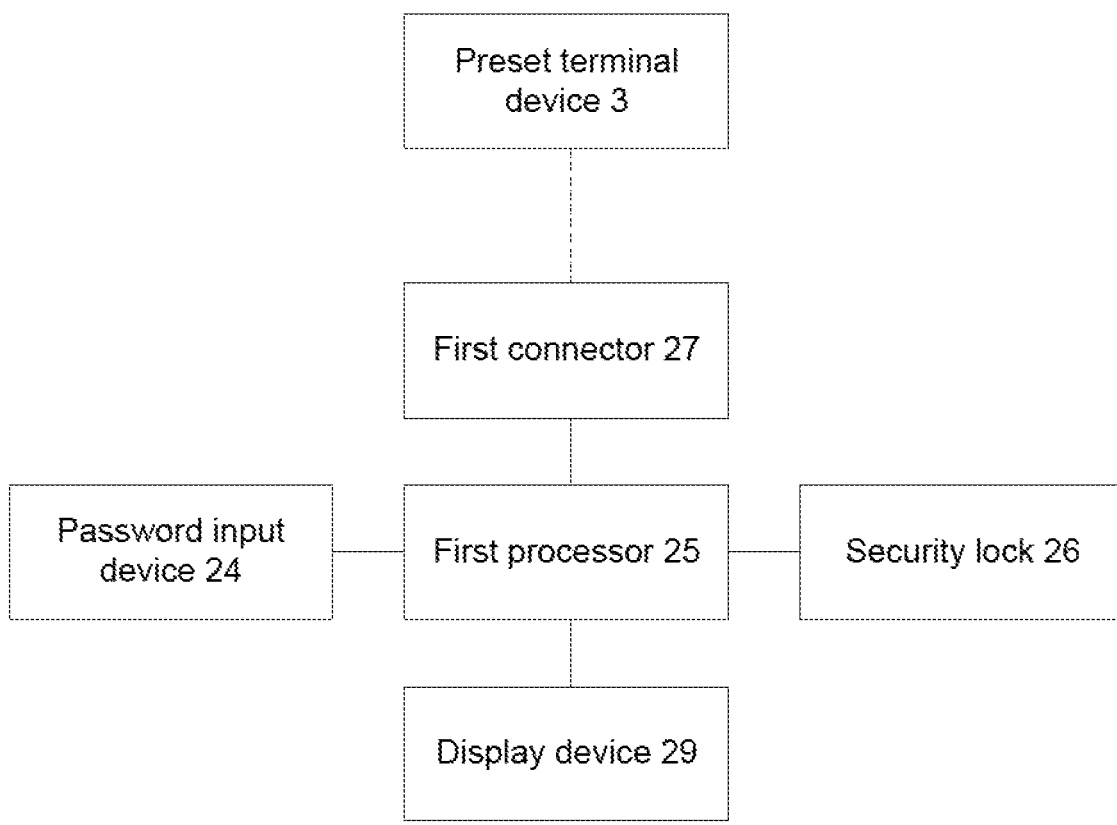
FIG. 5 is a schematic structural diagram of a movable box according to another embodiment of the present disclosure.

Further, as shown in FIG. 5, the above movable box further comprises a display device 29 which is connected to the first processor 25. When the first processor 25 is connected to the preset terminal device 3, the preset terminal device 3 is used to transmit logistics information to the display device 29 through the first connector 27 and the first processor 25, so that the display device 29 displays the logistics information. In this, embodiment, the preset terminal device 3 is used to transmit the logistics information to the display, device 29 through the first connector 27 and the first processor 25, so that the display device 29 displays the logistics information, and thereby the delivery man may deliver the package according to the logistics information. In addition, the display device 29 may also be used to display package information and device information, for example, a serial number of the movable box, an express number, and a date of arrival of the express etc. A consignee may view express information through the display device 29 to determine a specific condition of the package.

Further, the above first processor 25 may comprise an information memory which may store preset Chinese characters and pictures, and these preset Chinese characters and pictures, for example, "Goods have been collected", are displayed on the display device 29 according to specific conditions to remind the consignee that the packages have been collected. In addition, the information memory may further store password information generated by the first processor 25. After the first processor 25 generates the password information, the first processor 25 may enter a low-power sleep state. When the password information needs to be read, the password information in the information memory may be directly read without waking up the first processor 25, thereby reducing power consumption of the system and prolonging the use time.

Further, the display device 29 may be implemented using an electronic ink screen. When the first processor 25 is in a wake-up state, the electronic ink screen is in a high power consumption display state, and the electronic ink screen may display image information or change the image information, which is mainly used for users' operation and human-computer interaction. When the first processor is in the sleep state, the electronic ink screen may be in a low-power display state. At this time, the display information of the electronic ink screen is only maintained as a fixed image screen and may not be changed, but a user may also learn about the package information through the image screen. In this way, it may not only ensure a display function of the information, but also reduce the power consumption, thereby improving the practicability and effectiveness of the package storage device.

Figure 6:
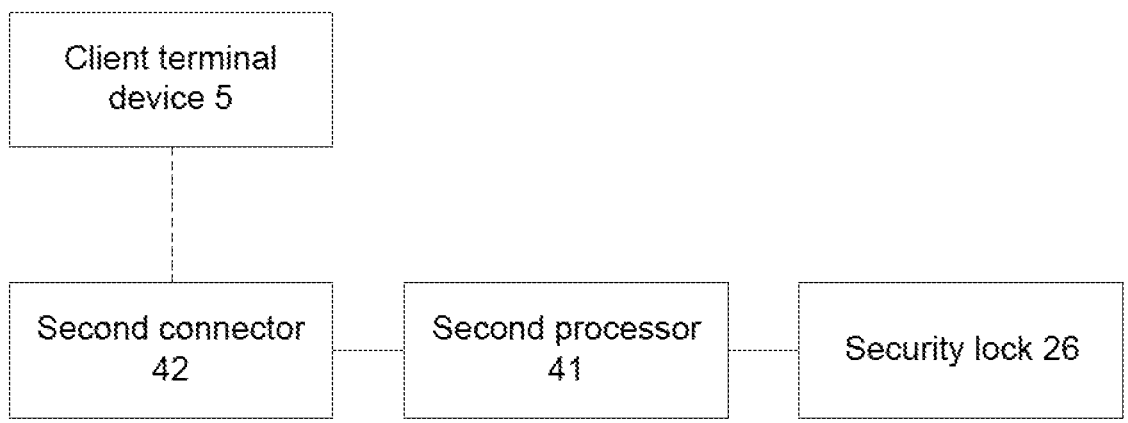
FIG. 6 is a schematic structural diagram of a movable box according to another embodiment of the present disclosure.

In addition to a hardware input device such as the password input device 24, the above verification component 23 may also adopt other manners. As shown in FIG. 6, in an embodiment, the verification component 23 comprises a second connector 42 and a second processor 41. The second connector 42 is connected to the second processor 41, which is connected to the security lock 26. The second connector 42 is used to be wirelessly connected to a client terminal device 5 to acquire identity verification information transmitted by the client terminal device 5. When the identity verification information is the unlocking information, the second processor 41 controls the security lock 26 to be unlocked. In this embodiment, the second connector 42 may be implemented using an infrared connector, a Bluetooth connector, an NFC connector, etc. In a practical application process, the client terminal device 5 such as a mobile phone etc. may be connected to the second connector 42 by a client, and the client may input, on the client terminal device 5, identity verification information, for example, a password, a fingerprint, a face, etc., which is transmitted to the second processor 41 through the second connector 42. The second processor 41 may compare the identity verification information with the unlocking information. When the identity verification information is the unlocking information, the second processor 41 may control the security lock 26 to be unlocked. In this embodiment, the second connector 42 and the second processor 41 may be disposed, so that the identity verification information may be input through the client terminal device 5, which simplifies the structure of the package storage device, reduces the manufacturing cost of the package storage device, and may further ensure the safety of its use.

Further, the movable box 2 further comprises a solar cell panel disposed thereon, and the solar cell panel is connected to power consuming devices on the movable box 2 to supply power to the power consuming devices. In this embodiment, the power consuming devices may be all electronic devices on the movable box, for example, the first processor 25, the second processor 41, the first connector 27, the second connector 42, the display device 29, etc. The solar cell panel may be connected to the above electronic devices and supply power to the electronic devices. The solar cell panel is disposed, which may, on one hand, avoid external power supplies and improve the convenience of using the movable box 2, and on the other hand, may ensure power supply to the movable box 2, thereby avoiding external charging and making it more convenient to use.

The embodiments of the present disclosure provide a movable box and a package storage device, which are used to reduce a vacancy rate of the package storage device. In the related technologies, there are different use conditions of lockers in different communities or at different times. Some communities may have insufficient lockers, and some communities may have many vacant lockers, which makes it difficult to match the lockers with a volume of package delivery, thereby resulting in a problem of a low utilization rate of the lockers. Compared with the related technologies, the package storage device according to the present embodiment comprises a fixing mechanism and movable boxes. Here, the fixing mechanism has a plurality of stoppers disposed thereon, and each of the movable boxes is detachably connected to at least one of the plurality of stoppers of the fixing mechanism. In a practical application process, a delivery man may detach a movable box from the fixing mechanism and bring it to a package station, and when there is a package to be delivered, the delivery man may place the package in the movable box, deliver the movable box to a fixing mechanism of a community, dispose the movable box at at least one stopper of the fixing mechanism, and bring the movable box back to the package station after a user collects the package from the movable box. In this way, all the movable boxes on the fixing mechanism have packages, which improves the utilization rate of the movable boxes and reduces the high vacancy rate of the movable boxes.

Figure 7:
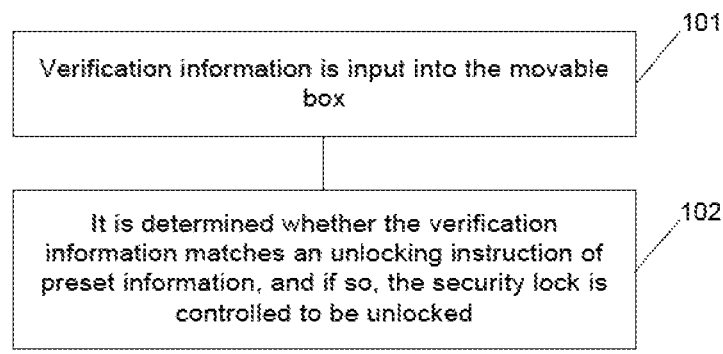
FIG. 7 is a method for controlling a movable box according to an embodiment of the present disclosure.

On the other hand, as shown in FIG. 7, the present disclosure further provides a method for controlling the movable box, which comprises the following steps.

In step 101, verification information is input into the movable box.

In step 102, it is determined whether the verification information matches an unlocking instruction of preset information, and if so, the security lock is controlled to be unlocked.

Here, in step 101, after a delivery man places a package into the movable box, the delivery man may place the movable box on a fixing mechanism in a community or at downstairs of an office building, and a consignee may acquire verification information in an information communication manner, for example, through the Internet, and input the verification information into the movable box. The verification information may be a password, a Quick Response (OR) code, characters, graphics, etc., which will not be specifically limited here. There may be many input manners, for example, the verification information may be input through an input keyboard on the movable box, or the verification information may be input through a mobile terminal device such as a mobile phone etc. and may be transmitted to the movable box by wirelessly connecting the mobile terminal device to the movable box, or a QR code may be scanned for unlocking by further disposing a camera on the movable box.

Here, in step 102, the movable box may store preset information, which is used to determine whether an identity of the consignee is correct. Specifically, the preset information may be a password, characters, a OR code, graphics, etc., and may be used as an unlocking instruction. There may be multiple groups of information in the preset information, and one group of information may be selected from the multiple groups of information as an unlocking instruction. For example, the preset information may comprise multiple groups of passwords arranged in order, and one of the passwords among the multiple groups of passwords may be used as an unlocking instruction, and the password is replaced with another password every 24 hours as an unlocking instruction to ensure the security of the package storage device. Of course, there may also be only one group of information in the preset information, and the group of information is used as an unlocking instruction, which is not specifically limited here. When the verification information input by the consignee matches the unlocking instruction, the security lock on the movable box may be automatically unlocked, so that the consignee may collect the package from the movable box, wherein there may be multiple matching manners, for example, the verification information being the same as the unlocking instruction, the verification information being associated with the unlocking instruction etc. The movable box may be left on the fixing mechanism, and after the delivery man comes to the fixing mechanism again and finds that packages in the movable box are collected, the movable box may be taken away to load other packages therein.

The embodiments of the present disclosure provide a method for controlling a movable box, which is used to reduce a vacancy rate of the package storage device. In the related technologies, there are different use conditions of lockers in different communities or at different times. Some communities may have insufficient lockers, and some communities may have many vacant lockers, which makes it difficult to match the lockers with a volume of package delivery, thereby resulting in a problem of a low utilization rate of the lockers. Compared with the related technologies, the method for controlling a movable box according to the present embodiment comprises: firstly, inputting verification information into the movable box; and then, determining whether the verification information matches an unlocking instruction of preset information, if so, controlling the security lock of the movable box to be unlocked, so that a consignee may collect the package in the movable box while the movable box being left on the fixing mechanism, and after a delivery man comes to the fixing mechanism again and finds that packages in the movable box are collected, the delivery man may take away the movable box to load other packages therein. In this way, all the movable boxes on the fixing mechanism have packages, which improves the utilization rate of the movable boxes and reduces the high vacancy rate of the movable boxes.

Figure 8:
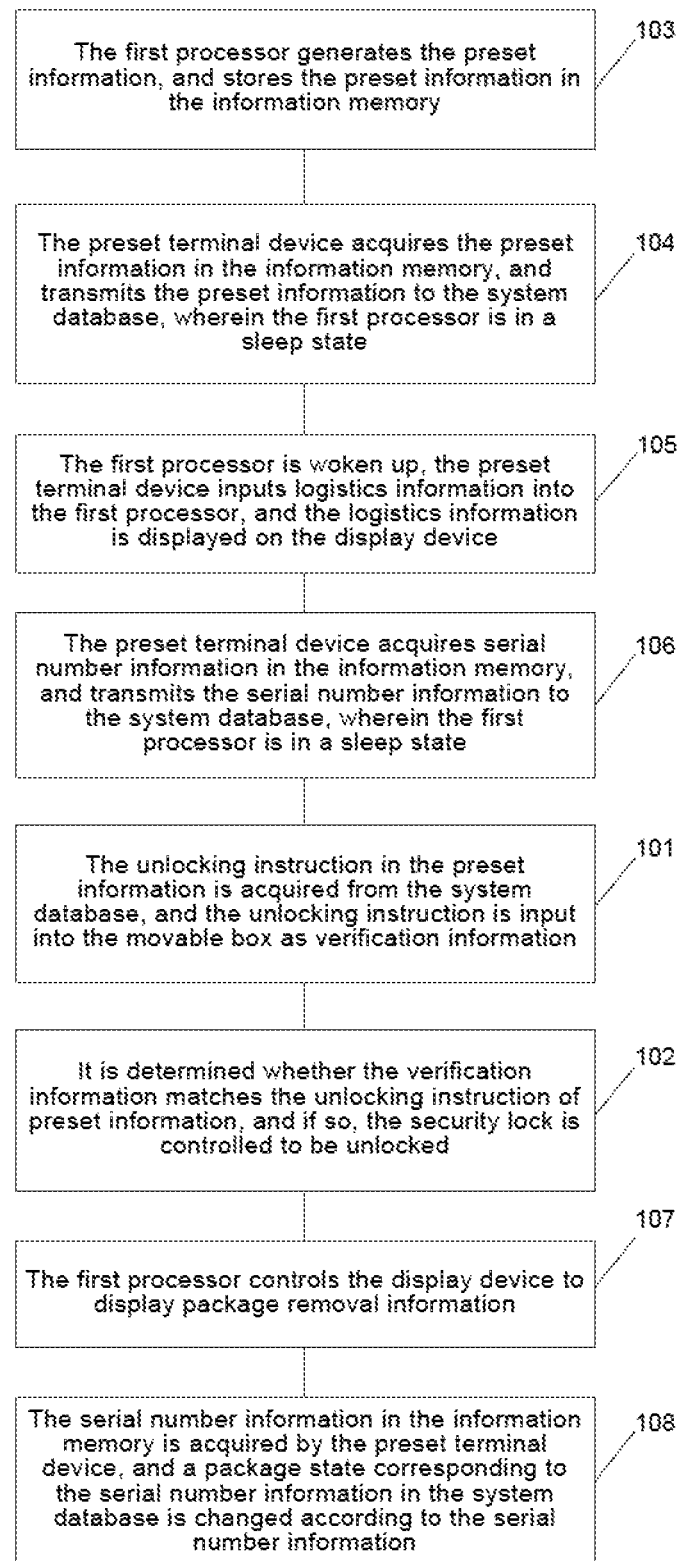
FIG. 8 is a method for controlling a movable box according to another embodiment of the present disclosure.

As shown in FIG. 8, before the above step 101, the method further comprises the following step.

In step 103, the first processor generates the preset information, and stores the preset information in the information memory.

Here, the delivery man may store a package in the movable box after opening the box door for a first time, and the first, processor in the movable box may generate preset information after the delivery man closes the door and store the preset information in the information memory, and then, the first processor may be in a sleep state, which may save the energy of the movable box. When the preset information needs to be acquired, the preset information may be directly acquired from the information memory without waking up the first processor, which further realizes energy saving.

As shown in FIG. 8, after step 103, the method further comprises the following step.

In step 104, the preset terminal device acquires the preset information in the information memory, and transmits the preset information to the system database, wherein the first processor is in a sleep state.

Here, the preset terminal device may be set to be hold by the delivery man with hands, and may be a mobile terminal device, for example, a mobile phone, a tablet computer, etc., which is not limited here. After the package is placed into the movable box, the first processor in the movable box may generate preset information for unlocking. The preset terminal device may be connected to the first processor by the delivery man, and the preset information in the information memory is acquired by the first processor and is transmitted to the remote system database through, for example, a network. In this process, the delivery man may not read the preset information on the preset terminal device and thus may not open the movable box, which further improve the safety of the package storage device. When the delivery man needs to open the movable box, the delivery man may read an unlocking instruction in the preset information through the system database to unlock the movable box. Here, in a process of the preset terminal device acquiring the preset information from the information memory, the first processor may be in a sleep state, which may realize low energy consumption of the first processor, thereby enhancing the service life.

As shown in FIG. 8, after step 104, the method further comprises the following step.

In step 105, the first processor is woken up, the preset terminal device inputs logistics information into the first processor, and the logistics information is displayed on the display device.

Here, after the delivery man places the package into the movable box and closes the box door, the preset terminal device may be connected to the first processor of the movable box by the delivery man, and transmit logistics information of the package to the first processor. After the first processor receives the logistics information, only the logistics information may be displayed on the display device, so that a consignee may determine whether there is his/her own package in the movable box through the logistics information displayed on the movable box. Here, the display device may be an electronic ink screen, which may achieve an effect of reducing energy consumption.

As shown in FIG. 8, after step 155, the method further comprises the following step.

In step 106, the preset terminal device acquires serial number information in the information memory, and transmits the serial number information to the system database, wherein the first processor is in a sleep state.

Here, after the delivery man places the package into the movable box and closes the box door, the preset terminal device may be connected to the information memory on the first processor of the movable box by the delivery man, read the serial number information stored in the information memory, and transmit the serial number information to the system database, wherein the serial number information is an identification number of the movable box, which is used to mark the movable box. Here, the serial number information may match the preset information, and may be transmitted to the consignee, so that the consignee may confirm a movable box where the package is located through the serial number information and the logistics information, and open the movable box through an unlocking instruction in the preset information box. Here, the first processor is in a sleep state when the preset terminal device acquires the serial number information of the information memory, so as to achieve the effect of reducing energy consumption.

As shown in FIG. 8, step 101 comprises:

acquiring the unlocking instruction in the preset information from the system database, and inputting the unlocking instruction into the movable box as verification information.

Here, the above system database may be connected to a network. When the consignee needs to collect the package, the mobile terminal device may be connected to the network by the consignee to acquire the unlocking instruction in the system database, then wake up the first processor in the movable box, and input the unlocking instruction into a package storage device as the verification information, and the first processor determines whether the verification information matches the unlocking instruction of the preset information, if so, the box door is opened, and if not, the box door is not opened.

The preset information comprises a plurality of random passwords arranged in order.

The preset terminal device wakes up the first processor, so that the first processor and the database system perform timing at the same time, and the first processor and, the database system replace a current random password with a succeeding random password at the same time every preset time as the unlocking instruction of the preset information.

Here, when the delivery man closes the box door for a first time, the preset information generated by the first processor may comprise multiple random passwords arranged in order. For example, the preset information may comprise ten random passwords which may be arranged in order as a first random password to a tenth random password, and the delivery man may transmit the ten random passwords arranged in order to the system database through the preset terminal device. When the delivery man delivers the movable box to the fixing mechanism, the delivery man may wake up the first processor through the preset terminal device, and a first one of the ten random passwords is used as an unlocking instruction while performing timing, and the first random password is replaced with a next random password as an unlocking instruction every 24 hours. If the movable box is not opened for first 24 hours, a consignee may apply for an unlocking instruction from the system database again and acquire a new password, and so on, which may further improve the security of package delivery.

As shown in FIG. 8, the method further comprises the following step.

In step 107, the first processor controls the display device to display package removal information.

Here, when the consignee collect the package and then closes the box door, the first processor may control the display device to display package removal information, for example, information indicating that the package has been collected, etc., to remind the delivery man that the package in the movable box has been collected. At this time, the delivery man may take back the movable box so as to load other packages therein. In this embodiment, the delivery man may more easily understand that the package in the movable box has been collected, which improves the working efficiency of the delivery man.

As shown in FIG. 8 after step 107 the method further comprises the following step.

In step 108, the serial number information in the information memory is acquired by the preset terminal device, and a package state corresponding to the serial number information in the system database is changed according to the serial number information.

Here, when the consignee collects the package and then the delivery man takes away the movable box again, the preset terminal device may be connected to the first processor by the delivery man, acquire the serial number information in the information memory, and change the package state in the system database according to the serial number information, to, for example, a state in which the package has been collected, and at the same time, the first processor may further be woken up, so that the first processor deletes the preset information and the package information in the information memory, and the movable box may be opened without verification, which on one hand, may improve the efficiency of the first processor, and on the other hand, may also facilitate the delivery man storing other packages.

In another aspect, the present disclosure further provides a computer readable storage medium having stored therein computer instructions, which cause a computer to implement the method for controlling a movable box.

Here, the storage medium is a computer program product, which when executed on a data processing device, is suitable for implementing the above method for controlling a movable box.

Through the description of the above implementations, it should be appreciated by those skilled in the art that embodiments of the present application can be provided as methods, systems, or computer program products. Accordingly, the present application may take a form of a pure hardware embodiment, a pure software embodiment, or a combination of software and hardware aspects. Moreover, the present application may take a form of a computer program product implemented on one or more computer usable storage media (including but not limited to disk storage, CD-ROM, optical memory, etc.) in which computer usable program codes are included.

The present application is described with reference to the flowcharts and/or block diagrams of the methods, devices (systems) and computer program products according to the embodiments of the present application. It should be understood that each flow and/or block in the flowcharts and/or block diagrams as well as a combination of the flows and/or blocks in the flowcharts and/or block diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate means for implementing functions specified in one or more flows in the flowcharts and/or one or more blocks in the block diagrams.

These computer program instructions can also be stored in a computer readable memory capable of introducing a computer or other programmable data processing devices to operate in a particular mode. Thereby, the instructions stored in the computer readable memory generate an article of manufacture comprising instruction means for implementing functions specified in one or more flows in the flowcharts and/or one or more blocks in the block diagrams.

These computer program instructions can also be loaded onto a computer or other programmable data processing devices, so as to enable a series of operation steps to be performed on the computer or other programmable devices to generate a computer-implemented process. Thereby, the instructions executed on the computer or other programmable devices provide a step of implementing functions specified in, one or more flows in the flowcharts and/or one or more blocks in the block diagrams.

In a typical configuration, a computing device comprises one or more processors (CPUs), an input/output interface, a network interface; and a memory.

The memory may comprise a volatile memory, a Random Access Memory (RAM) and/or a nonvolatile memory such as a Read Only Memory (ROM) or a flash memory (flash RAM) in a computer readable medium. The memory is an example of the computer-readable medium.

Computer-readable media comprise non-volatile and volatile, and removable and non-removable media, which can store information using any method or technology. The information may be computer readable instructions, a data structure, a program module, or other data. Examples of the computer storage media comprise, but are not limited to, Phase Change RAM (PRAM), Static Random Access Memory (SRAM), Dynamic Random Access Memory (DRAM), other types of Random Access Memories (RAMS), Read Only Memory (ROM), Electrically Erasable Programmable Read-Only Memory (EEPROM), flash memory or other memory technology, Compact Disk Read-Only Memory (CD-ROM), Digital Versatile Disc (DVD) or other optical storage, cassette tape, tape magnetic disc storage or other magnetic storage devices, or any other non-transmission medium, and may be used to store information that can be accessed by the computing device. As defined herein, the computer-readable medium does not comprise transitory media, such as a modulated data signal and a carrier.

The above description is only specific implementations of the present disclosure, but the protection scope of the present disclosure is not limited thereto. Changes or substitutions which are easily reached by any person skilled in the art within the technical scope disclosed in the present disclosure should be covered within the protection scope of the present disclosure. Therefore, the protection scope of the present disclosure should be defined by the protection scope of the claims.

We claim:

1. A movable box comprising a box body, a box door, a security lock and a verification component, wherein
   the security lock is connected between the box body and the box door,
   the verification component is disposed on a surface of the box door and is connected to the security lock, and the verification component is configured to acquire verification information, and control the security lock to be unlocked in response to the verification information being preset information, and
   a first locking member is further disposed in the box body at a bottom thereof, and the first locking member protrudes downward from the bottom of the box body,
   wherein the verification component comprises a password input device and a first processor, wherein the password input device is connected to the first processor, the first processor is connected to the security lock, the password input device is configured to input password verification information, and the first processor is configured to control the security lock to be unlocked in response to the password verification information being unlocking information;
   wherein the movable box further comprises:
   a first connector connected to the first processor, and configured to be in signal connection to a preset terminal device, wherein the preset terminal device is connected to a network server, and the first processor is configured to transmit the unlocking information to the preset terminal device through the first connector in response to the first processor being in signal connection to the preset terminal device, so as to transmit the unlocking information to the network server through the preset terminal device, such that the unlocking information is available to a client after the client passes identity verification in the network server.

2. The movable box according to claim 1, further comprising:
   a sensing element connected to the first processor, and configured to detect an open/closed state of the box door, and transmit information of the open/closed state to the first processor, wherein the first processor randomly generates the unlocking information when the box door is in a closed state.

3. The movable box according to claim 2, further comprising:
a display device connected to the first processor, wherein the preset terminal device is configured to transmit logistics information to the display device through the first connector and the first processor when the first processor is connected to the preset terminal device, so that the display device di splays the logistics information.

4. The movable box according to claim 3, wherein the display device is an electronic ink screen.

5. The movable box according to claim 1, wherein the verification component comprises a second connector and a second processor, the second connector is connected to the second processor, the second processor is connected to the security lock, the second connector is configured to be wirelessly connected to a client terminal device to acquire identity verification information transmitted by the client terminal device, and the second processor controls the security lock to be unlocked when the identity verification information is unlocking information.

6. A package storage device, comprising:
a fixing mechanism having a plurality of stoppers disposed thereon; and
the movable box according to claim 1, wherein the movable box is detachably connected to at least one of the plurality of stoppers of the fixing mechanism.

7. The package storage device according to claim 6, wherein the at least one stopper comprises a corresponding second locking member which is mutually locked with the first locking member of the movable box, and the second locking member or the first locking member is further connected to an unlocking member which is configured to unlock the second locking member from the first locking member.

8. The package storage device according to claim 7, wherein the second locking member comprises a lock hole, the first locking member comprises a lock pillar which is configured to be inserted into the lock hole, so that the second locking member is mutually locked with the first locking member.

9. The package storage device according to claim 7, wherein the unlocking member comprises a lock body and a transmission member, the lock body is connected to the second locking member or the first locking member through the transmission member, the lock body has a key hole disposed thereon, and the key hole is configured to cause the lock body to move, so that the second locking member is unlocked from the first locking member.

10. A method for controlling a movable box, which is applied to the movable box according to claim 1, the method comprising:
inputting verification information into the movable box; and
determining whether the verification information matches an unlocking instruction of the preset information, and if so, controlling the security lock to be unlocked.

11. The method according to claim 10, wherein the preset information is generated in advance by a first processor and is stored in an information memory of the movable box, and the method comprises:

acquiring, by a preset terminal device, the preset information in the information memory, and transmitting the preset information to a system database, wherein the first processor is in a sleep state.

12. The method according to claim 11, further comprising:
waking up the first processor in a sleep state, inputting, by the preset terminal device, logistics information into the first processor, and displaying the logistics information on a display device.

13. The method according to claim 12, further comprising:
after displaying the logistics information on the display device, acquiring, by the preset terminal device, serial number information in the information memory, and transmitting the serial number information to the system database, wherein the first processor is in a sleep state.

14. The method according to claim 13, wherein inputting verification information into the movable box comprises:
acquiring the unlocking instruction in the preset information from the system database, and inputting the unlocking instruction into the movable box as the verification information.

15. The method according to claim 14, wherein the preset information comprises a plurality of random passwords arranged in order, and
determining whether the verification information matches the unlocking instruction of the preset information, and if so, controlling the security lock to be unlocked further comprises:
waking up, by the preset terminal device, the first processor, causing the first processor and the database system to perform timing at the same time, and replacing, by the first processor and the database system, a current random password with a succeeding random password at the same time every preset time as the unlocking instruction of the preset information.

16. The method according to claim 15, further comprising:
after determining whether the verification information matches the unlocking instruction of the preset information, and if so, controlling the security lock to be unlocked, controlling, by the first processor, the display device to display package removal information.

17. The method according to claim 16, further comprising:
after the first processor controls the display device to display the package removal information, acquiring, by the preset terminal device, the serial number information in the information memory, and changing a package state corresponding to the serial number information in the system database according to the serial number information.

18. A computer readable storage medium, having stored therein computer instructions, which cause the computer to implement the method for controlling a movable box according to claim 10.

* * * * *